(12) United States Patent
Marks

(10) Patent No.: US 10,555,640 B1
(45) Date of Patent: Feb. 11, 2020

(54) DETACHABLE ELEMENT GRILL SUPPORT

(71) Applicant: Joel S Marks, Sherman Oaks, CA (US)

(72) Inventor: Joel S Marks, Sherman Oaks, CA (US)

( * ) Notice: Subject to any disclaimer, the term of this patent is extended or adjusted under 35 U.S.C. 154(b) by 430 days.

(21) Appl. No.: 15/399,708

(22) Filed: Jan. 5, 2017

(51) Int. Cl.
*A47J 37/04* (2006.01)
*A47J 37/07* (2006.01)

(52) U.S. Cl.
CPC ........... *A47J 37/04* (2013.01); *A47J 37/0786* (2013.01)

(58) Field of Classification Search
CPC ....... A47B 55/02; A47B 57/58; A47B 57/581; A47B 65/15; A47B 96/04; A47F 3/147; A47F 5/0031; A47F 5/005; A47F 5/01; A47F 5/132; A47F 7/148; A47J 37/00; A47J 37/04; A47J 37/049; A47J 37/07; A47J 37/0704; A47J 37/0786; A47J 2037/0795
USPC ..................... 99/419, 421 V; 211/85.4, 181.1
See application file for complete search history.

(56) References Cited

U.S. PATENT DOCUMENTS

| 526,135 | A | 9/1894 | Stone |
|---|---|---|---|
| 691,833 | A | 1/1902 | Williamson |
| 1,969,601 | A | 8/1934 | Foch |
| 2,183,938 | A | 12/1939 | Lewis |
| 2,584,295 | A | 2/1952 | Sanzenbacher |
| 2,616,360 | A | 11/1952 | Thompson |
| 3,053,169 | A | 9/1962 | Rappaport |
| 3,324,524 | A | 6/1967 | Perron et al. |
| 3,326,389 | A | * 6/1967 | Richter, Jr. ............... A47F 5/01 211/86.01 |
| 3,379,118 | A | 4/1968 | Perez |
| 3,405,631 | A | 10/1968 | Thomas, Jr. |
| 3,540,369 | A | 11/1970 | Brooks Hice |
| 4,625,634 | A | 12/1986 | Kruper |
| 4,709,626 | A | 12/1987 | Hamlyn |
| 4,848,217 | A | 7/1989 | Koziol |
| 4,924,768 | A | * 5/1990 | Jay ...................... A47J 37/0694 211/125 |
| 4,930,642 | A | * 6/1990 | Brooks .................... A47F 3/14 211/181.1 |
| 5,008,508 | A | 4/1991 | Skerker et al. |
| 5,069,117 | A | 12/1991 | Schlessel |
| 5,158,009 | A | 10/1992 | Stewart |
| 5,814,795 | A | 9/1998 | Kim et al. |
| 5,842,409 | A | 12/1998 | Loffler et al. |
| 6,119,588 | A | 9/2000 | Tiemann |
| 6,192,792 | B1 | 2/2001 | Gremillion |
| 6,553,896 | B1 | 4/2003 | Heide |
| 6,823,773 | B2 | 11/2004 | Swinford et al. |
| D543,802 | S | 6/2007 | Fuchs |

(Continued)

FOREIGN PATENT DOCUMENTS

| CA | 2369389 A1 * | 7/2003 | ............ A47J 37/067 |
|---|---|---|---|
| DE | 102008003562 A1 * | 7/2009 | .............. A47J 37/04 |

(Continued)

*Primary Examiner* — Lorne E Meade
*Assistant Examiner* — Michael S. Poetzinger

(57) ABSTRACT

A low cost cooking appliance to support food items above a rack, pan or equivalent. In a preferred embodiment the present invention includes an array of substantially vertically oriented points. The points detachably supported on a base structure. The disassembled elements can be stored and transported in a compact form. The base structure preferably includes a function to at least partly shield the food from direct heat from below.

19 Claims, 2 Drawing Sheets

(56) References Cited

U.S. PATENT DOCUMENTS

| | | |
|---|---|---|
| 7,281,469 B1 | 10/2007 | Barbour et al. |
| 7,516,693 B2 | 4/2009 | Kam |
| 7,669,523 B1 | 3/2010 | Zemel et al. |
| 7,707,929 B1 | 5/2010 | Bourgeois et al. |
| 7,942,278 B2 | 5/2011 | Martin et al. |
| D755,011 S | 5/2016 | West |
| 2007/0000395 A1 | 1/2007 | Kam |

FOREIGN PATENT DOCUMENTS

| | | | |
|---|---|---|---|
| EP | 0648065 A2 | 4/1995 | |
| WO | WO-2010109077 A1 * | 9/2010 | .......... A47J 37/0786 |

* cited by examiner

DETACHABLE ELEMENT GRILL SUPPORT

FIELD OF THE INVENTION

The present invention relates to cooking accessories. More precisely, the invention relates to a low cost food cooking support structure.

BACKGROUND

Food may be prepared by cooking on various heating appliances. Examples include barbecue and oven. Typically the food is laid out horizontally or in two dimensions on a grill, rack or pan. On a barbecue an elongated item such as a back rib, chicken wing or leg for example will be strongly exposed on its downward side to the heat source requiring frequent turning for even cooking. In an oven pan a food item will soak in its juices which may cause sogginess or be unhealthful for meats with fats.

SUMMARY OF THE INVENTION

In a preferred embodiment the present invention includes an array of substantially vertically oriented spikes, points, skewers, or equivalent elongated members. The points are preferably detachably supported on a base structure whereby the points can be removed for cleaning the components or to use other point sizes or lengths. The disassembled elements can be stored and transported in a compact form. The base structure preferably includes a function to at least partly shield the food above from direct heat or flame from below.

DETAILED DESCRIPTION OF THE PREFERRED EMBODIMENTS

Figure 1:
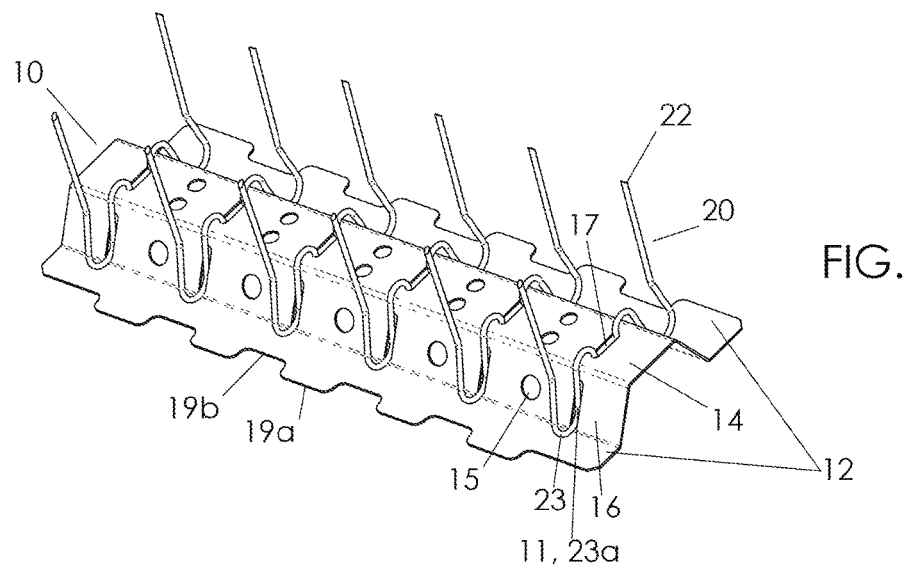
FIG. 1 is a perspective view of a preferred embodiment grill support assembly.

FIG. 1 shows a preferred embodiment of the present invention. A preferably multiple array or set of substantially vertical spikes or points 22 is arranged upon a support structure including frame or base 10. The base may include as few as a single spike although for typical cooking needs a set of points is useful to support a group or variety of food items to be cooked. As shown, there are a total of 12 spikes with each single wire form 20 including ends terminating in two respective spikes per wire form. Wire form 20 may equivalently be formed by other processes including stamping, for example, in a thin section where the term wire form used herein includes such alternate structures.

With the spikes oriented vertically the food items may be cooked more evenly than the same items being flat on a grill. For example a common elongated food article such as most meat items laying flat on a conventional grill normally requires regular flipping to prevent burning. When held vertically such an elongated item will cook evenly over a larger portion of its surface. In another example, when used in an oven, the support assembly holds the food items vertically and well above a drip tray. The food will not become soggy or heavy in meat drip fats.

Wire forms are preferably detachable from base 10 or equivalent structure so that they may be stored and/or shipped flat. The detachable or changeable spikes may also be replaced with a wire form spike set of a different length, shape, or wire diameter. For example if a user is to barbecue shrimp or chicken wings, a spike about 2-3 inches long may be suited. For ribs a taller spike may be preferred. Spike sizes or styles may be mixed on one base. The ability to disassemble the grill support assembly is helpful for shipping of the product. A shipping box can be compact being substantially just the size of base 10 while wires 20 are arranged flat in the box along a plane largely parallel to base 10. This option to disassemble contributes well to the commercial potential of the grill support assembly in the preferred embodiment of the invention whereby shipping, transport and in-store stocking can be a substantial portion of the total cost of selling products. Further an end user can easily clean and store the disassembled grill support device. In contrast a fixed assembly or one that includes movable but not readily detachable spikes or equivalent structures will be difficult to clean since the joining features will present confined spaces that cannot be accessed for such cleaning. However if desired the spikes and base may be further securely attached together by fasteners or other means. Preferably as shown wire form 20 is a substantially two dimensional form. This simplifies its design and allows the small storage and shipping package described.

Figure 2:
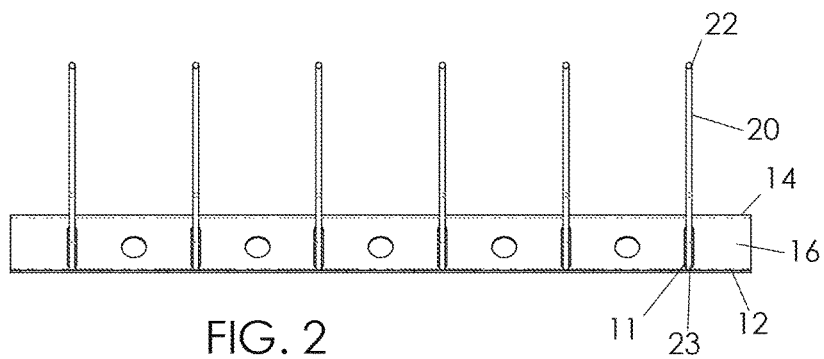
FIG. 2 is a side elevation of the assembly of FIG. 1

While the spikes and base are preferably separable in normal use, wires 20 and the corresponding spikes are operatively held securely to base 10. Base 10 includes slot openings or equivalent mating structures 11 and 17 to align, guide and hold wire forms 20. Equivalent structures for example include a hole, recess, rib, edge, or tab of base 10, not shown, that can position wire 20. Slot 17 is through a highest position of base 10 on top portion 14. Slot 11 extends to a lowest practical location or base bottom on sides 16 at or near a level of bottom flanges 12. Base 20 therefore has bends to extend vertically in height, vertical in FIGS. 2 and 3, including at least two separate and vertically spaced levels to attach and stabilize the wire form. Wire form 20 extends into slot 11 at side loop area 23a, FIG. 3 forming a first mating portion of the wire form. Loop 25 extends into slot 17. These slot engagements stabilize the wire laterally and rotationally in FIG. 2 preferably at a highest and lowest position on the base as shown. By preferably engaging at these extreme vertical base positions, or at least at substantially differing vertical locations, the height of base 10 can be minimized while preserving effective function for the base. With the assembly including base 10 being of minimal height the food items will remain stable with respect to tipping in FIG. 3. Flange 12 provides a lower position limit to the wire at side loop area 23.

One skilled in the art understands that optionally a single elongated slot of base 10 can extend far enough vertically to secure the wire form in position as described above. One skilled in the art further understands that flange 12 need not be flat, sized, or horizontal as shown, but may form a roll, hem or edge defining a lower extent of sides 16. Also understood by one skilled in the art, slots openings in base 10 may comprise equivalent structures for example include a hole, recess, rib, edge, or tab of base 10, that can position wire 20.

As described above the spikes may be attached or supplemented by fasteners, welding or equivalent means whereby the positioning and heat shield function is preferably preserved while base 10 may then optionally be less tall.

Figure 3:
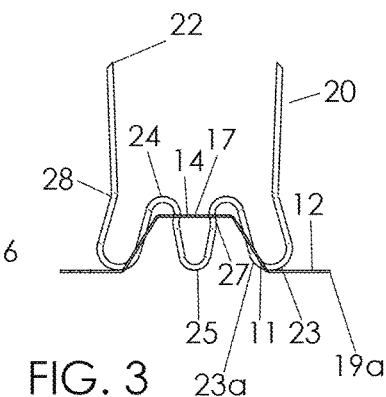
FIG. 3 is an end view of the assembly of FIG. 1.

To hold the wire form laterally in the view of FIG. 3 loop 25 extends through base slot 17. Loop 25 includes wide portion 27 with a narrow portion above forming bend or detent structure in the wire such as a smooth arrow shape as shown, FIG. 3, or equivalent structure. Wide portion 27 is sized slightly wider than a length of slot 17 to create an interference fit to the slot. This interference or detent fit secures the wire form to the base in the vertical direction and against rotation upon the base in FIG. 3. Wide portion 27 and its immediately adjacent wire segments are a second mating portion of the wire form.

Figure 7:
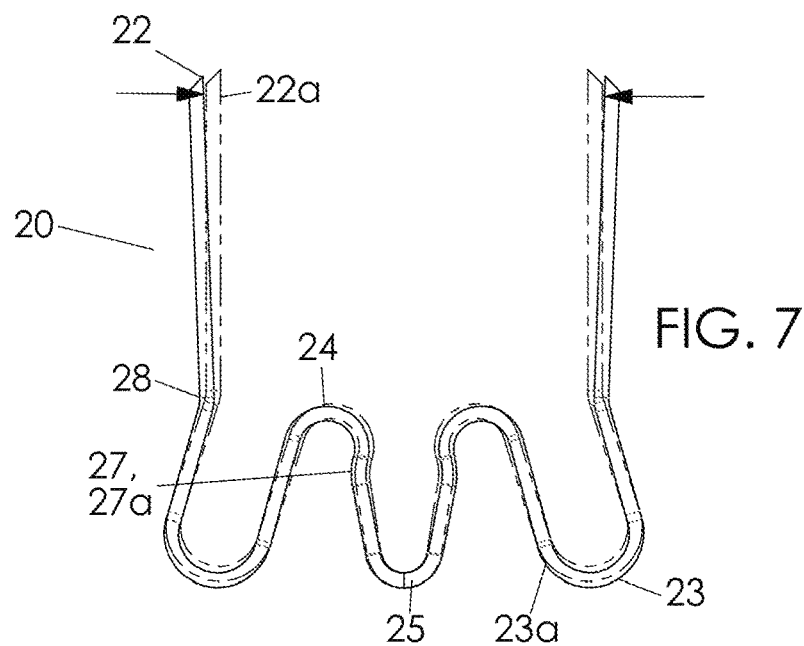
FIG. 7 is an elevation view of a spike element including a selectively squeezed shape.

To detach, the wire form may be forcibly pulled upward. However the wire form is preferably resilient so that it can be more easily removed by squeezing the top of the wire near spike points 22. This is seen in FIG. 7 where a deflected shape is in phantom. The deflecting force corresponds to the arrows in the Figure. As upper spike points 22 are squeezed to the position of 22a loop 25 closes so that wide portion 27 becomes less wide at pressed position 27a. This less wide spacing is preferably equal or less than the length of slot 17 so that wire form 20 is free to be extracted from upper slot 17. The wire form then also slides out vertically from the pair of side slots 11. Preferably loop 25 is near a lower position limit of base 10 so that loop 25 has sufficient wire length and resilience to facilitate the above described motion of wide portion 27.

One skilled in the art understands that the above design allows a comfortable and intuitive squeezing effort to detach the wire form while holding it in place during normal use.

As shown slots 11 and 17 are in flat sections of base 10. Optionally the base may include an outside corner, for example similar to the corner that joins side 16 to top 14, with a slot at the corner. Then a straight or concave portion of wire form 20 can engage the slot rather than the convex portion such as 23a as shown.

Spike 22 is preferably positioned inward of a width extent of base 10 as defined in the present instance by tab 19a, FIG. 1. This positioning keeps the assembly stable when food items are on the spikes. As seen in FIG. 3 spike 22 is preferably inboard of tab 19a. So for example if food items are placed on one side only of the assembly the assembly will not tip over. Similarly if a tall food item such as a full size rib rack is cradled between the spikes, for example along a central length of the device, the assembly remains stable. Cradling is practical in the preferred embodiment since there are at least two rows of spikes linearly arrayed along a length of base 10 with the food item able to be held by resting between the spike rows without piercing. Piercing by one or more spikes is as described above also a normal mode of use, although the vertical rows of wire may optionally not include sharp points whereby cradling may be a primary use mode. In one variant, not shown, a spike may be angled or jogged outward on base 10 to more fully expose the food item to the heat source beyond an edge of base 10, for example vertically or at an angle to vertical, if desired. Such a spike can be used along with the spikes as shown on a same base.

As seen in FIG. 7 the distal end points of the spikes 22 may be sharp, as illustrated, preferably with a single angled cut as shown to be within conventional automated wire form operations. The spikes may include an upper and lower segment joined at bend 28. This allows spike 22 to be inwardly positioned as discussed above while loop 23 can be of relatively large and smooth radius. With a large radius side loop portion 23a extends well into side slot 11 to securely engage the slot. Other loop profiles for loop portion 23a or other loops may include sharp bends at selected locations of the loop. For example a sharper bend at the location of leader 23a in FIG. 3 may further engage slot 11. The bend at 28 does not preclude a food item being held on the spike below bend 28 whereby the full height of the wire form can be used to hold food items. The bend may suggest a location to optionally keep the food above to reduce possible burning in certain conditions. Bend 28 may further provide a physical stop location for the food item depending how sharp the bend is or which other features are attached or provided at this location. Upper loop 24 is spaced from wide portion 27 to allow the corresponding snap-fit narrowing above wide portion 27. As shown wire form 20 includes five loops, two outer loops 23 to stabilize a lower part of the wire form, two intermediate upper loops 24 to clear top portion 14 of the base, and a central lower loop 25 to releasably engage base 10.

Other locations may include snap or friction interference features to hold wire form 20 to base 10. For example an indent bend in the wire of wire form 20 just above the leader 23a in FIG. 3, not shown, may selectively engage a top of slot 11. Alternately the ends of wire form 20 may be a loop, bend or other structure.

Figure 4:
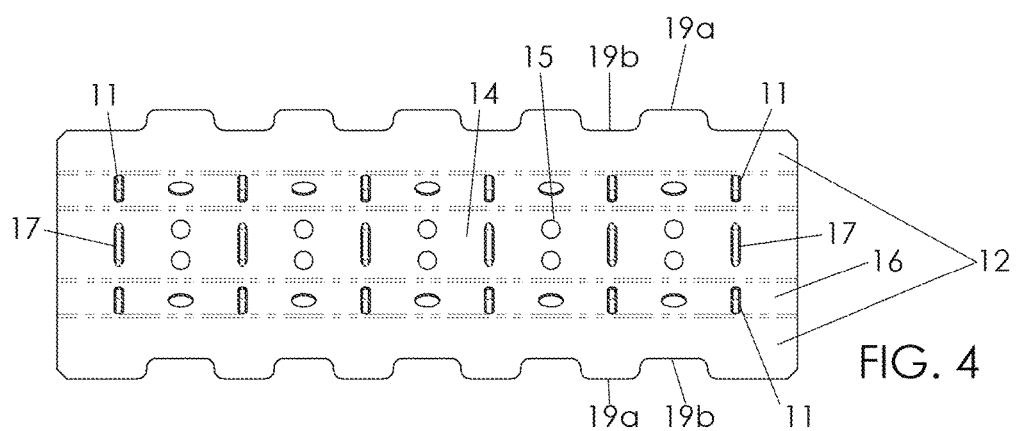
FIG. 4 is a bottom view of a base for a grill support.
Figure 5:
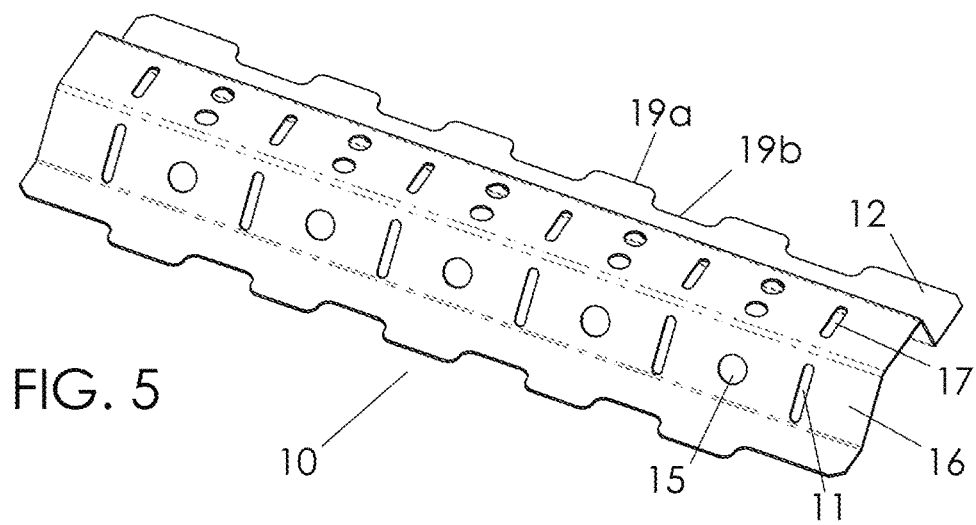
FIG. 5 is top perspective view of the base of FIG. 4.
Figure 6:
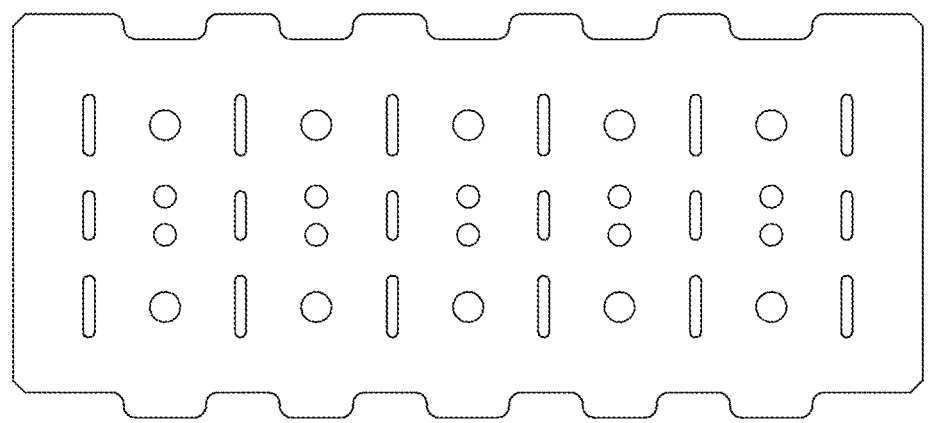
FIG. 6 is the base of FIG. 4 in a flat, pre-formed condition.

As seen in FIG. 4 base 10 may include tabs 19a and recesses 19b. This serrated edge can help diffuse a flame heat effect as it surrounds the base. The serrations may be finer or courser. As shown the tabs and recesses are offset on each side to make the base asymmetric. This reduces material use in manufacture since the stamped blanks, one of which is shown in FIG. 6, can nest with no gaps or wasted material between the progressive stampings.

As suggested above base 10 preferably provides a heat shield for the food items. The preferably sheet metal structure of the base protects the food items from direct exposure to a barbecue flame or heating element. This protection will reduce a tendency to burn the food that a barbecue or other cooking appliance can cause. Openings 15 may be included on selected faces of base 10 to assist with cooking by allowing some convection heat from a flame or other source to pass through the shield formed by base 10.

According to the preferred embodiment described the grill support structure is inexpensive to produce and transport. Its manufacture preferably requires no secondary operations such as riveting, welding machining, drilling or fastening etc. The only assembly required is for packaging the loose parts that comprise the grill support structure. Instead the simple and readily reversible assembly is done by the end user. The base is a simple sheet stamped form with preferably straight simple and parallel bends. The wire form is in a single plane without coining, pressing or other slow or non-automated operations.

Optionally additional features may be added, formed, or attached to one or both of the base and wire forms. For example other grill accessories including additional base 10 units may be attached together for example to add stability or enlarge the heat shield effect if desired. In one embodiment base 10 may include a tab and corresponding recess, not shown, by which engagement holds the bases in a relative position.

While the particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. An appliance to support food items comprising:
a base, the base including an upper slot vertically spaced from a lower slot; and
a wire form structure, the wire form detachably supported on the base in an assembled condition including portions of the wire form extending into the upper and the lower slots respectively to hold the wire form in first and second lateral and rotational positions on the base; and
a bent segment of the wire form contacting an edge of either said upper or lower slot, the wire form being resilient including an installed shape and a deflected shape, the installed shape including the wire form being confined in the slot, the deflected shape including the wire form being free of confinement in the slot to enable the wire form to be extracted from the slot and detached from the base; and
the base is a sheet metal form including a side face and a top face, the lower slot being in the side face, the upper slot being in the top face, the wire form engaged to the respective upper and lower slot locations, the wire form being stabilized on the base by the vertically spaced engagement locations.

2. The appliance of claim 1 wherein the wire form includes bent loop portions, and the loops extend into the slots.

3. The appliance of claim 2 wherein the wire form includes upward extending terminal ends comprising spikes, the base includes two side faces with respective lower slots, the loops are between the terminal ends with two outer loops and a central loop, the central loop is confined within the upper slot and the outer loops held in the lower slots.

4. The appliance of claim 3 wherein the central loop includes a wire bend forming a detent feature, the detent feature engages the upper slot to secure the wire form against upward motion of the central loop out of the upper slot.

5. The appliance of claim 4 wherein the detent feature includes a deflected condition wherein the central loop contracts to become free to extract from the upper slot.

6. The appliance of claim 1 wherein the assembled condition of an assembly of the base and wire form includes the wire form extending upward from the base, and a detached condition of the assembly includes the wire form laying substantially parallel with a length of the base.

7. The appliance of claim 6 wherein the wire form is of a two dimensional form.

8. The appliance of claim 3 wherein base includes an outer width extent, the spikes are above the base and positioned inward of the width extent.

9. The appliance of claim 8 wherein the base extends along a length, and the width and length of the base define a barrier below the wire form to diffuse heat from a heat source below the base.

10. The appliance of claim 9 wherein the base includes openings within to partly expose the spikes of the wire form to the heat source.

11. The appliance of claim 10 wherein a plurality of wire forms is positioned on the base to form an array of wire forms and respective features thereof.

12. An appliance to support food items comprising:
a base, the base comprising substantially a sheet metal form including an elongated top portion, sides joined to each side of the top portion extending along a length of the base, and a flange joined to a lower part of the each side whereby the base includes said top portion and said flanges spaced below the top portion by the sides;
an opening in at least one of the top portion, sides and flanges;
a wire form detachably fitted to the base, the wire form resiliently engaged to the opening to hold the wire form to the base at the opening;
a deflected condition of the wire form including a reduced engagement of the wire form to the base at the opening whereby the wire form can be normally extracted from the base; and
the wire form includes five loops, two outer loops engaged to slots of the base adjacent to the flanges, two intermediate upper loops, and a central loop extending through a slot in the top base portion.

13. The appliance of claim 12 wherein the opening is within the top portion, a loop of the wire form extends downward through the opening, the loop includes a wide portion, a first condition of the wire form having the wide wire portion wider than a size of the opening whereby the wide portion is retained under the opening in an attached condition of the wire form, a second deflected condition of the wire form having the wide wire portion becoming of reduced width whereby the deflected wide wire portion is freed of retention and able to be extracted from the opening.

14. The appliance of claim 13 wherein the wire form includes normally upward extending spikes opposed across a width of the base, the spikes are spaced above the top base portion, and deflecting the spikes inward causes the wide wire portion to decrease toward the second condition.

15. A cooking appliance to support food items comprising:
a base, the base comprising substantially a metal form including bends to extend the base in a vertical direction between a bottom and a top of the base;
an upper and a lower slot respectively on each of the top and the bottom of the base; and
a wire form configured to be inserted into the slots of the base, the wire form being engaged to the upper and lower slots to hold and stabilize the wire form to the base at an upper and lower location of the wire form.

16. The cooking appliance of claim 15 wherein the slots are openings in the base, the base is of a sheet metal form, a segment of the wire form extends into the openings to operatively hold the wire form in position at the openings, the wire form is resilient including a deflected condition wherein the wire form is free to be extracted from the openings to detach the wire form from the base.

17. The cooking appliance of claim 16 wherein a first and a second mating portion of the wire form selectively engage respective the openings of the lower and upper slots.

18. The cooking appliance of claim 17 wherein the wire form is bent to form a detent at a narrow segment at the second mating portion, and the upper mating structure confines the narrow segment of the wire form wherein the narrow segment presses an edge of the base to hold the wire form to the base at the detent of the wire form.

19. The cooking appliance of claim 15 wherein the wire form includes a distal end spike positioned substantially above the top of the base.

* * * * *